No. 11,937. Reissued Oct. 15, 1901.

R. H. CHURCHILL.

EMERY WHEEL.

Witnesses:

C. E. Nichols

Alvin E. Davis

Inventor:

Robert H. Churchill

UNITED STATES PATENT OFFICE.

ROBERT H. CHURCHILL, OF MARINETTE, WISCONSIN.

EMERY-WHEEL.

SPECIFICATION forming part of Reissued Letters Patent No. 11,937, dated October 15, 1901.

Original No. 678,292, dated July 9, 1901. Application for reissue filed September 12, 1901. Serial No. 74,154.

*To all whom it may concern:*

Be it known that I, ROBERT H. CHURCHILL, a citizen of the United States, residing at Marinette, in the county of Marinette and State of Wisconsin, have invented a new and useful Improvement in Emery-Wheels for Use on Automatic Saw-Sharpening Machines, of which the following is a specification.

My invention relates to improvements in the shape or configuration of emery-wheels which are used in automatic saw-sharpening machines in which both the side and edge faces of the wheel are used; and the object of my improvement is to so dispose the material in the wheel that both grinding-faces will maintain a constant form and the same relative position as the wheel wears away, whereby the life of the wheel is prolonged and a saving of time is effected in sharpening the saw whenever a new wheel is substituted for one that is worn out. These advantages are attained by an emery-wheel of the shape illustrated in the accompanying drawings, as will appear in the following detailed description.

Figure 1:
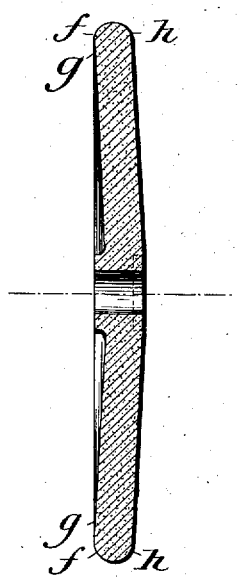
Figure 3:
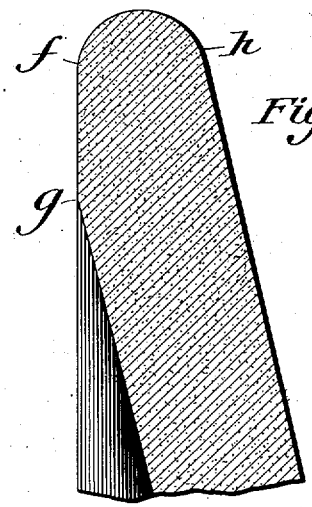
Figure 2:
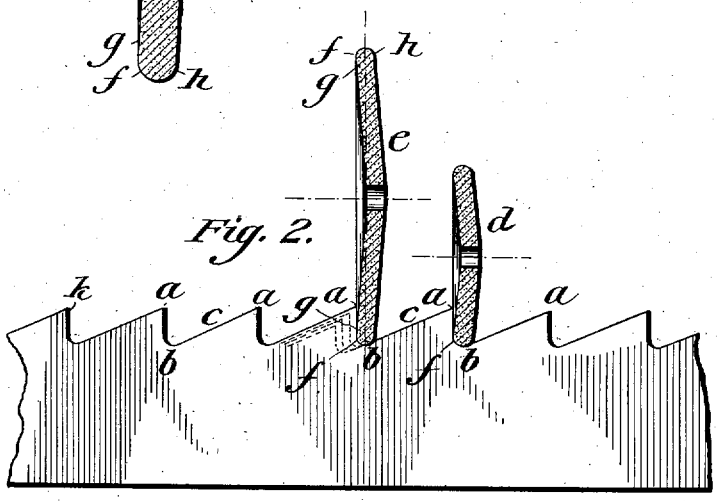

Figure 1 shows a central vertical section of the wheel. Fig. 2 shows a portion of a band-saw with a new and a nearly-worn-out wheel applied thereto. Fig. 3 is an enlarged view of the grinding-faces.

In order to give a full understanding of the advantages obtained by my form of wheel, it is necessary to set forth the relation in which it is intended to be employed.

The band-saws used in the manufacture of lumber from logs are from ten to fourteen inches wide, from forty-eight to fifty-four feet long, and are endless. To sharpen these saws, they are stretched teeth up over two idle pulleys, and engaging one side of the saw between these pulleys is the automatic sharpener. The saw-teeth are spaced from one and one-fourth to one and three-fourths inches apart and are of the general form shown in Fig. 2, the hook and spread being given to the teeth by swaging after the grinding is finished. The teeth are ground by the emery-wheel being bodily actuated while rotating at a comparatively high speed downwardly, with its side face engaging the face of the saw-tooth, as shown in Fig. 2. The wheel also grinds into the body of the saw below the line of the bottoms of the gullets, three successive cuts of the wheel being shown largely exaggerated for clearness in Fig. 2. The instant the gullet is ground out as above indicated the sharpener feeds the saw along under the wheel just the length of one tooth, and during this feed movement the machine raises the wheel automatically, so that its edge face makes a slight cut along the back *c* of the tooth just sufficient to clear off the groove of the old swaging, (shown at *k*,) thus preserving the proper angle between the back *c* and the front *a b* of the saw-tooth. It is thus seen that the wheel grinds on its side face and also on its edge face, and my invention consists in so shaping the wheel that the size and disposition of these faces remain constant all through the life of the wheel. The result of this constancy of the working faces of the wheel is that a worn-out wheel, as *d*, may be replaced by a new one, as *e*, and the grinding be proceeded with at once without loss of time. On the other hand, if the worn wheel *d* has lost its proper shape it will have impressed its differences from the shape of *e* on all the saws that have passed under it, and when the new wheel is put on it will be necessary to go all around each saw one or more times to correct irregularities in the shape of the teeth before any real sharpening can be done. This is because an emery-wheel that is being fed over saw-teeth at a certain rate can make only a certain maximum cut. If more that this has to be ground off—say at the bottom of the tooth—either two cuts must be taken or the rate of feed must be reduced.

I make my wheel concave within its grinding side face in order that as the side and edge faces of the wheel wear away under continued use the points of the saw-teeth may always pass the engaging part of the side face of the wheel, and when the wheel is in the position shown at *d* or *e* the point of the tooth is opposite the concave part of the wheel, and thus no shoulder is formed on the side face of the wheel to destroy the points of the teeth. The side grinding-face is an annulus, as *f g*, which is perpendicular to the axis, the concave side extending from *g* to the hub. The edge grinding-face *f h* is formed according to the shape of gullet required between the saw-teeth. In order to prevent the formation of a shoulder on the side face, no matter to what diameter between the maximum and minimum the wheel may be worn, the rate of wear on the side face of the wheel must maintain a constant relation to the rate of wear on the edge face. In order to keep the rate of wear of the edge face constant, the thickness of the wheel is made the same from the hub to the side face *f g*, and the wear on the side face is kept constant by making the inclination of the concave face to the axis constant at all points from the hub outward to the side face. Furthermore, the thickness of the wheel must bear the same relation to the amount of edge-face grinding required that the inclination of the concave side to the axis bears to the amount of side-face grinding required. I have found by experience that a twelve-inch wheel five-eights of an inch thick with five-sixteenths inch concavity at the hub gives the proper proportion of thickness to concavity, so that after such a wheel has been worn to eight inches in diameter it will have the saw-teeth the same shape they were originally, so that when a new twelve-inch wheel is put on the machine it may be started at once on a sharpening cut without wasting any time in bringing the teeth back to their original shape, as has heretofore been required.

I wish it to be understood that wheels embodying my invention may be used with equal advantage in sharpening gang and circular saws on an automatic machine, although for convenience I have detailed the essential features thereof in connection with band-saws. Further, the form of the periphery of the wheel is not of the essence of my invention, but is merely a function of the form of gullet required between the teeth. Also the shape of the hub is immaterial to my invention, various shapes thereof being shown in full and dotted lines in Fig. 1. It is also to be understood that the relative proportions of wheel above given may be varied as the relative amounts of side and edge face grinding are varied. Thus if more edge-face grinding is required, the side grinding remaining the same, the wheel should be made thicker, or if more side-face work is required, the edge-face work remaining the same, the wheel may be made thinner, so its diameter will wear away fast enough to allow the tooth-points to always pass the side grinding-face, or the concavity may be increased without making the wheel thinner.

Having now particularly described and ascertained the essentials of my invention, what I claim is—

1. A wheel composed of emery or other abrasive material having an edge grinding and side grinding face, the sides of any diametral cross-section of which are parallel from the hub to the side grinding-face, and have a slight and constant inclination to the axis of the wheel, the side grinding-face being perpendicular to the axis, whereby the increasing thickness of the edge grinding-face as it wears toward the hub will be reduced by the wear on the side grinding-face.

2. A wheel composed of emery or other abrasive material, having an edge grinding and a side grinding face perpendicular to the axis, the wheel inside the latter face being slightly concave and at a constant inclination to the axis, the thickness of the wheel being constant from the hub to the side grinding-face, whereby both grinding-faces remain constant while the edge grinding and side grinding are proportional to the respective grinding-faces.

3. A concave emery-wheel of uniform thickness, having a side grinding-face perpendicular to the axis, and an edge grinding-face, the sides of the wheel having a constant inclination to the axis, each grinding-face being proportioned to the work required of it, whereby the convex side will compensate the loss in thickness due to side grinding and the concave side will obviate any shoulder being formed by side grinding.

4. An emery-wheel for sharpening saw-teeth provided with a rounded edge and a concave or concavo-convex body, the walls of which are parallel or nearly so, whereby as the concave side and edge wear away, the points of the saw-teeth may always pass the side of the wheel while the edge is deepening the gullet, all substantially as shown and described.

In testimony whereof I have signed my name to this specification in the presence of two subscribing witnesses.

ROBERT H. CHURCHILL.

Witnesses:

C. E. NICHOLS,

ALVIN E. DAVIS.